May 1, 1928.
G. WALKER
BRAKE OPERATING MECHANISM
Original Filed April 12, 1926
1,668,436
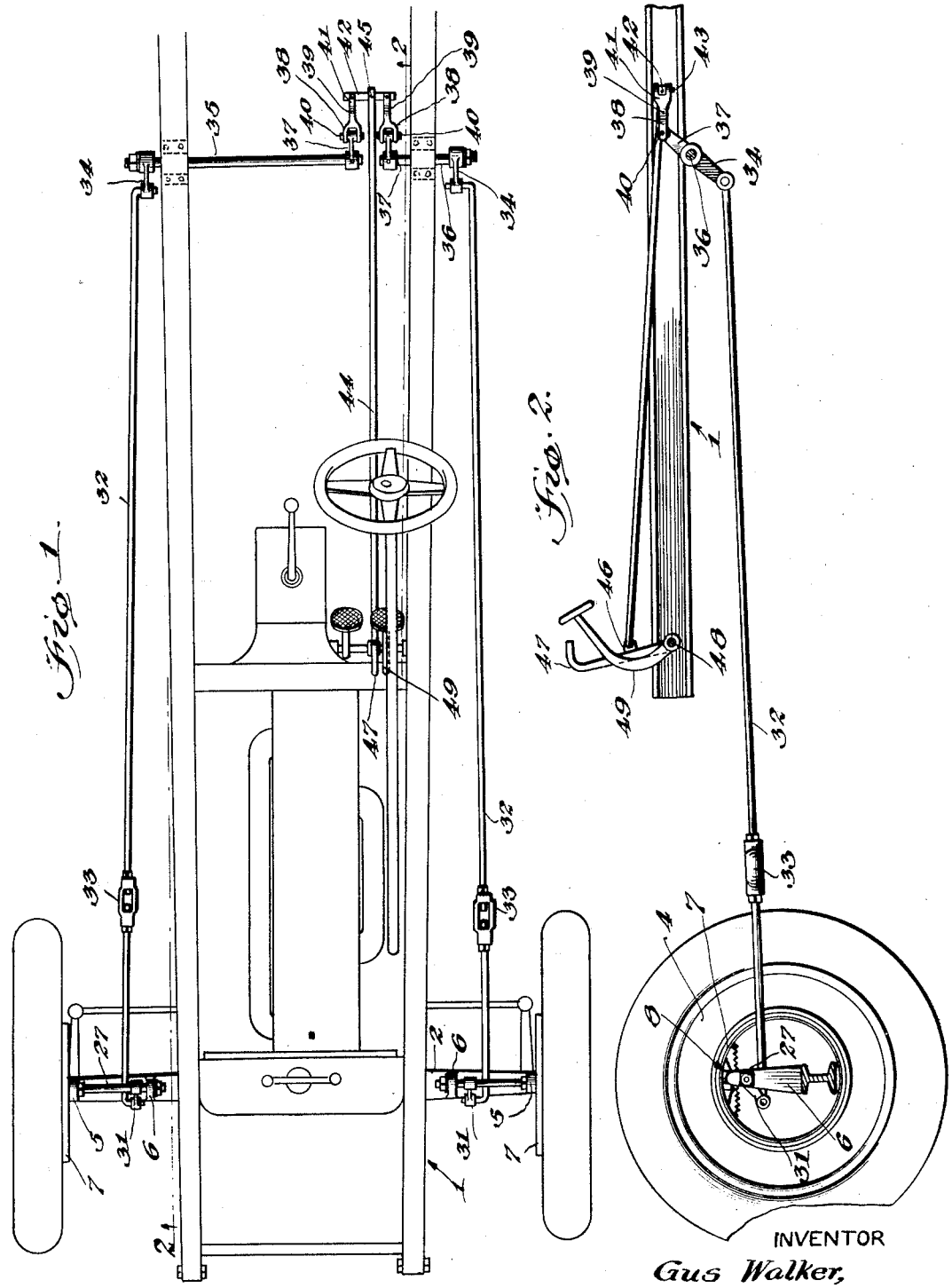
INVENTOR
*Gus Walker,*
BY
ATTORNEYS Patented May 1, 1928.

1,668,436

UNITED STATES PATENT OFFICE.

GUS WALKER, OF HUNTINGTON, WEST VIRGINIA.

BRAKE-OPERATING MECHANISM.

Original application filed April 12, 1926, Serial No. 101,489. Divided and this application filed August 20, 1926. Serial No. 130,485.

My invention relates generally to brakes for motor vehicles, and particularly to an operating mechanism for the brakes for the front or steering wheels of automobiles, and it consists in the combinations, constructions and arrangements herein described and claimed.

The present invention is a division of that which is disclosed in my prior co-pending application for patent for an improvement in brakes, Serial #101,489, filed April 12, 1926.

An object of the invention is the provision of a brake operating mechanism which is adapted to effect a quick and positive application of a braking action on each of the front wheels of an automobile which is equipped with the invention, even though considerable wear shall have taken place between relatively movable brake members of the device for either or both of the front wheels of the automobile.

A further object of the invention is the provision of a brake operating mechanism of the character described which is adapted to be actuated by the usual clutch lever of the associated automobile.

Other objects and advantages of the invention will be apparent from the following description, considered in conjunction with the accompanying drawings, in which Figure 1 is a more or less diagrammatic and fragmentary plan view of a portion of the chassis of an automobile and such operating members of the automobile as are associated with a brake mechanism embodying the invention and with which the automobile is equipped.

Figure 2 is a fragmentary vertical section taken substantially along the line 2—2 of Figure 1.

Referring now to Figure 1 of the drawings, the numeral 1 generally designates the frame of an automobile and 2 is the front axle on which the front end portion of the frame is supported in any suitable known manner. The front axle 2 carries the usual pivoted spindles on which the front or steering wheels 4 are mounted. In carrying out the invention, the end portions of the front axle 2 are provided at their extremities and adjacent to the inner sides of the wheels 4 with upstanding supporting arms 5 which are located above the levels of the axes of the adjacent spindles and which may be formed integrally with the axle 2 or may be formed separately from the front axle and secured thereto in any suitable known manner. The front axle 2 also is provided inwardly of the upstanding supporting arms 5 with other upstanding supporting arms 6 which also may be formed integrally with the axle 2. By referring to Figure 1, it will be seen that the supporting arms 6 are located at the outer sides of the side members of the frame 1 of the automobile.

A brake drum 7 is provided for each of the wheels 4. Each brake drum is secured firmly to the associated wheel 4 at the inner side of the latter by suitable fastening devices as is usual whereby each brake drum will be supported in concentric relation with the associated wheel 4.

In the brake drum 7 is disposed an expanding brake mechanism generally indicated at 8 which preferably has the detailed construction fully illustrated and described in my aforesaid co-pending application, Serial #101,489, but which, so far as the present invention is concerned, may be of any suitable known construction. The brake mechanism 8 is adapted to be expanded by means of a rock shaft 27. Each rock shaft 27 is journaled in aligned openings in the supporting arms 5 and 6 on the associated end portion of the axle 2.

The rock shafts 27 on the opposite end portions of the axle 2 carry forwardly and downwardly inclined and similarly disposed rocker arms 31. Similar motion transmitting rods 32 are provided at opposite sides of the frame of the automobile and have inwardly curved forward end portions pivotally attached to the rocker arms 31. Each of the rods 32 may comprise sections connected adjustably by a turnbuckle 33 so that the length of the rod 32 can be varied within limits as desired. The rearward end portions of the rods 32 are turned inward and are pivotally attached to the end portions of forwardly and downwardly inclined rocker arms 34 on axially aligned transverse rock shafts 35 and 36, respectively. The adjacent ends of the rock shafts 35 and 36 terminate short of each other and the rock shaft 36 is of less length than the rock shaft 35. The rock shaft 36 is journaled in a bearing in the side frame member of the automobile that is nearest to the operating mechanism of the automobile while the shaft 35 is journaled in a bearing in the other side member of the automobile frame. The inner end portions of the shafts 35 and 36 carry upwardly and rearwardly inclined rocker arms 37. The end portions of the arms 36 are straddled by horizontally spaced forks 38 at the forward ends of links 39 and are connected to the forks 38 by horizontal pivot elements 40. The rearward end portions of the links 39 are formed to produce vertically spaced forks 41 which straddle the end portions of a flat compensating bar 42 and are connected to the latter pivotally by vertical pivot elements 43. An operating rod 44 is attached adjacent to its rearward end by means of a pivot element 45 with the middle portion of the compensating bar 42 and the forward end portion of the rod 44 is turned laterally to produce a horizontal pivot element which is engaged with a horizontal opening in a rearwardly extending ear 46 on the middle portion of a brake operating lever 47. The brake operating lever 47 normally is inclined forwardly and upwardly and is fulcrumed at its lower end on the shaft 48 on which the lower end portion of the usual clutch lever 49 is mounted. The upper end portion of the lever 47 is curved to lie in the path of possible movement of the pedal at the upper end of the clutch lever 49 and the lever 47 will be a certain distance away. This distance is sufficient to permit a full operating stroke of the clutch lever without actuation of the brake lever.

From the foregoing description of the various parts of the device, the operation thereof may be readily understood. The operator of the car may swing the clutch lever 49 forward by foot pressure a distance sufficient to swing the clutch out of gear without actuation of the brake lever 47. However, if it is desired to apply the brakes to the front or steering wheels, the clutch lever is swung forward further and after contacting with the upper end of the brake lever 47, the latter also is swung forward, thereby causing motion to be transmitted to the rock shafts 27, which are rocked as required to apply the brakes 8. The compensating cross bar 42 will swing about the parallel vertical pivots 43 and 45 as required to assure firm application of the brakes for both front wheels of the automobile even though the wear on the cover of the brake ring of the brake for one front wheel is greater than the wear on the cover of the brake ring for the other front wheel.

Obviously, the invention is susceptible of embodiment in forms other than those which are illustrated in the accompanying drawings, and I therefore consider as my own all such modifications and adaptations thereof as fairly fall within the scope of the appended claims.

I claim:—

1. A brake mechanism for the front wheels of an automobile comprising brakes applied to said brake drum, a common actuating mechanism for said brakes, said actuating mechanism including a brake lever adapted to be actuated by the usual clutch lever of the automobile after said clutch lever has been swung beyond the limit of its normal operating stroke.

2. A brake operating mechanism for the brakes of the front wheels of an automobile comprising rock shafts for operating said brakes, a brake operating lever having the free end portion thereof disposed in a path of extended movement of the clutch lever of the automobile, and motion transmitting means connecting said rock shafts with said brake lever so that said rock shafts will be rocked simultaneously when said brake lever is operated.

3. An operating mechanism for the brakes of the front wheels of an automobile comprising rock shafts for applying said brakes, a brake operating lever having the free end portion thereof disposed in the path of extended movement of the clutch lever of the automobile, and motion transmitting means connecting said rock shafts with said brake lever so that said rock shafts will be rocked simultaneously when said brake lever is operated, said motion transmitting means between said brake lever and said rock shafts including a longitudinally movable rod for each of said rock shafts, said rod being adjustable as to length.

4. In brake mechanism for the front wheels of an automobile, a pair of axially aligned rock shafts respectively disposed adjacent to the inner sides of said front wheel at the outer sides of the frame of the automobile, means actuated by said rock shafts for operating the brakes for said front wheels, rocker arms on said rock shafts, a pair of axially aligned transverse rock shafts journaled in the side members of the frame of the automobile intermediate the length of the automobile, rocker arms on the outer ends of said second named rock shafts, rods connecting corresponding arms of said first named rock shafts with the arms of said second named rock shafts, other rocker arms on the inner end portions of said second named rock shafts, said last named rocker arms being diametrically opposite the rocker arms of the outer ends of said second named rock shafts, a pair of links connected to said last named rocker arms to swing about aligned horizontal axes, a compensating bar having the end portions thereof connected to the other ends of said links to swing about parallel vertical axes, a brake operating lever fulcrumed at its lower end, said brake operating lever being swingable about a horizontal axis, and a rod connected at its forward end to the middle portion of said brake operating lever to swing about a horizontal axis and connected at its rearward end to the middle portion of said compensating bar to swing about a vertical axis.

5. In combination, a motor vehicle, brake means for one pair of wheels thereof including rock shafts journalled adjacent the wheels, a pair of rock shafts on the vehicle frame, rods operatively connected with the rock shafts, an equalizing link connecting the pair of rock shafts, a longitudinally shiftable rod connected with the link, and a normally stationary actuating member pivotally connected with the longitudinally shiftable rod, and disposed in the path of movement of the automobile clutch lever to be engaged thereby to actuate the brakes upon manual operation of the clutch lever to disengage the clutch.

6. In combination, a motor vehicle, brake shoe actuating rock shafts journalled on one axle adjacent the wheels thereof, an upstanding pivotally supported arm arranged forwardly of the automobile clutch pedal and disposed in the path of movement of the latter and carried forwardly therewith when the clutch pedal is depressed, and means operable to actuate the rock shafts to actuate the brakes upon forward movement of the arm incident to the depression of the clutch pedal.

GUS WALKER.